May 5, 1959 H. A. SPEH 2,885,146

ELECTRONIC CHECKING DEVICE

Filed June 7, 1952 5 Sheets-Sheet 1

INVENTOR.
HERMAN A. SPEH
BY Thomas Sparks
ATTORNEY

May 5, 1959 H. A. SPEH 2,885,146

ELECTRONIC CHECKING DEVICE

Filed June 7, 1952 5 Sheets-Sheet 2

INVENTOR.
HERMAN A. SPEH
BY Thomas Sparks
ATTORNEY

ELECTRONIC CHECKING DEVICE

Filed June 7, 1952 5 Sheets-Sheet 3

INVENTOR.
HERMAN A. SPEH
BY Thomas Sparks
ATTORNEY

ELECTRONIC CHECKING DEVICE

Filed June 7, 1952 5 Sheets-Sheet 4

INVENTOR.
HERMAN A. SPEH
BY Thomas Sparks
ATTORNEY

INVENTOR.
HERMAN A. SPEH
BY Thomas Sparks
ATTORNEY

United States Patent Office 2,885,146

Patented May 5, 1959

2,885,146

ELECTRONIC CHECKING DEVICE

Herman A. Speh, Roosevelt, N.Y., assignor to Burroughs Corporation, Detroit, Mich., a corporation of Michigan Application June 7, 1952, Serial No. 293,481

21 Claims. (Cl. 235—61.11)

The invention relates generally to checking devices and the like, and it is particularly concerned with an electronically controlled device of this nature. The invention finds particular use in business machines, such as are provided with means for electrically sensing record cards and through decoding circuits determining the selection of certain electronic control devices. The electronic control devices may govern various functions, such as printing, card punching or the operation of other related machines. In those machines where employed, the subject of the present invention serves to recognize the proper functioning of the sensing mechanism and the electronic control devices and, in the event there should be a failure in either one or both, it serves through a proper arrangement to indicate this failure in suitable manner, such as by a light signal, or automatic stopping of further card feeding. The failure will also be indicated in some manner in the controlled machine or apparatus by a defect in printing, a failure to card punch, or a failure of further operation.

Business machines of this character are customarily designed for continuous cycling until stopped either by a manual cut-off of power or in some other manner. Through use of the present invention the machine is caused to automatically stop further card feed operations when a failure in the proper functioning of the electronic control devices has been indicated.

A general object of the invention is, therefore, to provide a checking device for recognizing in a machine the proper functioning or lack of functioning of electronic control devices.

A further object of the invention is to provide in a record card controlled machine a device for checking the proper functioning of electronic control devices associated with the sensing mechanism of the machine.

Another object of the invention is to provide an electronic checking device.

A still further object of this invention is to provide an electronic checking arrangement in a machine to automatically effect a discontinuance of machine operations upon finding of certain operational failures.

A still further object of this invention is an electronic checking device serving to recognize and to indicate in suitable manner a failure of proper functioning of electronic control devices in a machine.

The foregoing objects and advantages of this invention, as well as others, will become readily apparent as this specification unfolds in greater detail, and as it is read in conjunction with the accompanying drawings wherein a specific embodiment of the invention is illustrated. The inventive idea involved is capable of receiving a variety of expressions. Here, for purpose of illustration and for purpose of facilitating description of the invention as a whole, it is disclosed as applied to a record card controlled printing machine.

Figure 6:
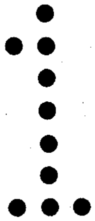
Figs. 5 and 6 are enlarged views of characters formed by a print head.
Figure 5:
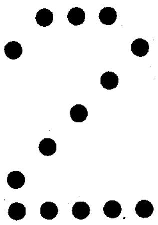

The invention is here disclosed as embodied in a wire printing machine of a type wherein there is contained a plurality of print heads, each head being adapted to print a single letter or digit, such as described in the application of Frederick Q. Rast, Serial No. 118,063, now Patent No. 2,681,614, filed September 27, 1949, in the U.S. Patent Office. Each head comprises a group of thirty-five print wires of the Bowden type arranged in parallel relation to each other. Each wire is controlled by a separate electromagnet which, when energized, causes the wire tip to be propelled slightly out of its head to effect printing of a dot on a paper form passing between the print head and the ribbon of a platen. Different combinations of dots form different characters, as in Figs. 5 and 6.

Figures 2, 3:
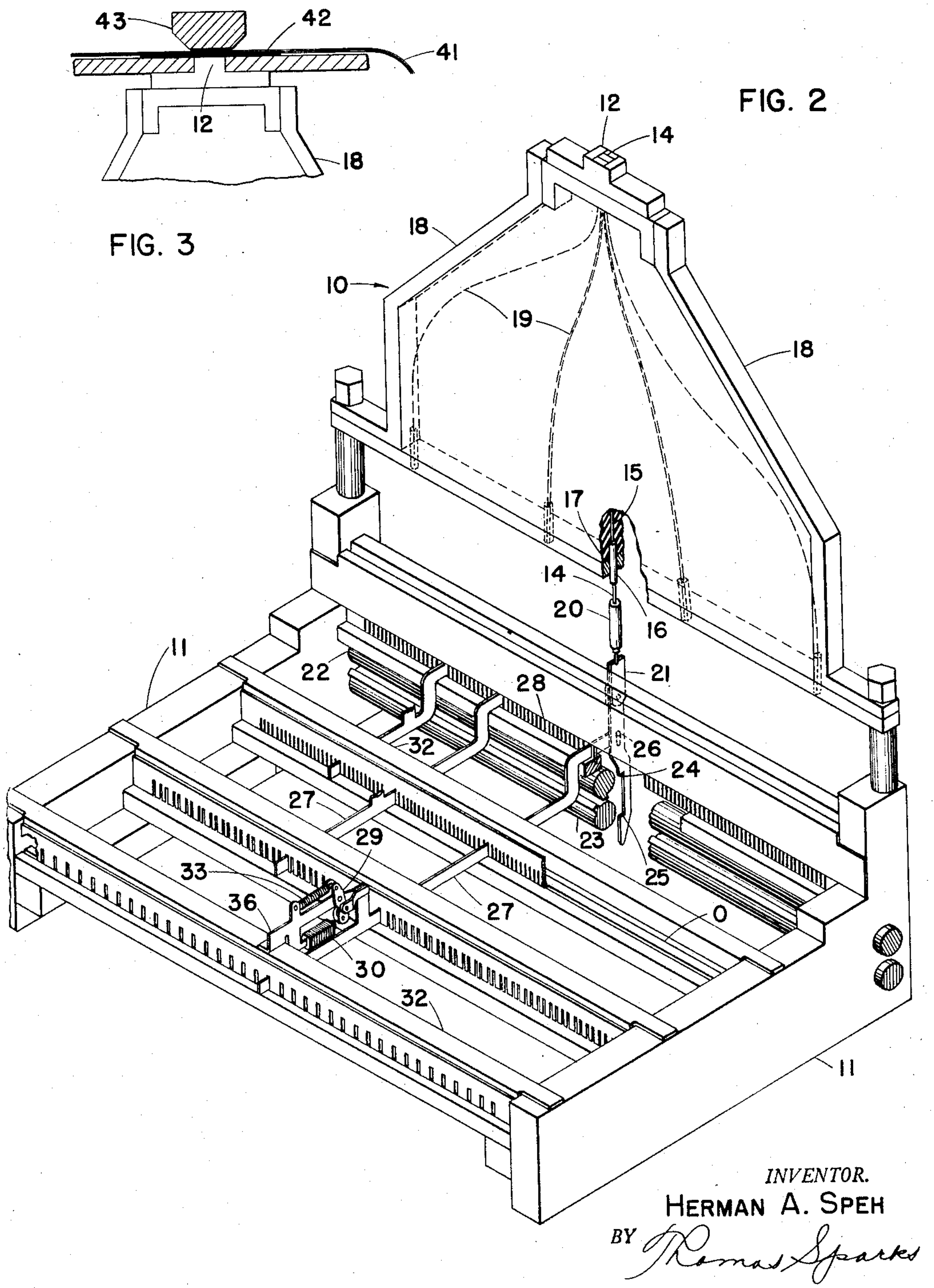
Fig. 2 is a view of a printing unit of the machine with some of the parts omitted.
Fig. 3 is a fragmentary view illustrating the association of the printing unit with a platen.

Reference is directed to Fig. 2 wherein there is shown a printing unit or a panel 10 of the machine, which is mounted upon and bridges the ends of a pair of spaced supports 11. The panel tapers towards its upper end to form a print head block 12. The head block, while it could contain several print heads, here shows three print heads 14 in a line. Individual to each print head are thirty-five print wires 15, each adapted for slidable movement in an individual flexible casing or tube 16 embedded fast in plastic material 17 contained between the frame retainers 18 of the print head panel. Each two of the dotted lines 19 are intended to represent thirty-five print elements associated with a print head. The print wires 15, of which it suffices to show but one (Fig. 2), the others being the same, extend slightly through the lower end of tubes 16, and the ends thereof are joined by suitable couplings 20 to individual interposers 21, which interposers are adapted to be oscillated to and from print position by a pair of cam drive shafts 22, 23, each continuously moving in a direction opposite to the other. One of the cam shafts is adapted to engage an upper shoulder 24 of the interposer to drive it to print position, the other is adapted to engage a lower shoulder 25 of the interposer to restore it after printing has been effected. Each interposer is connected by a vertical slot and pin 26 with a link 27. The latter is guided by suitable combs 28 and connects the interposer with the armature 29 of a related electromagnet 30. The core piece 36 of each magnet is secured to a cross rail 32 between the supports 11. The lateral supports and cross rails are adapted to contain between them the thirty-five magnets required for each print head of the panel. One of the magnets 30 and its associated print wire, the others being the same, appears in Fig. 2. Each interposer 21 is normally tensioned by its link 27 and related spring means 33 in a position where it is unengageable by the cam shafts 22, 23. Upon energization of its related magnet, an interposer is moved by the armature attached link 27 to a position engageable with the shafts 22, 23 and when the magnet is deenergized the interposer is tensioned by its related spring 33 back to its normal position. In each print head the print wires are driven to effect printing in various combinations after the appropriate magnets have been selected and energized. A digit will be formed corresponding to the combination of electromagnets and associated print wires selected.

Figure 4:
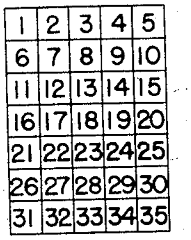
Fig. 4 is a diagram showing the arrangement of one of the print heads of the machine.

In Fig. 4 there is diagrammatically illustrated in plan the appearance of a print head and the arrangement of the print wires. Each square represents the tip of one of the print wires. It can thus be seen that to print the digit "1" as it appears in Fig. 5, the ten electromagnets 30 (Figs. 7, 7A) corresponding to the wires 3, 7, 8, 13, 18, 23, 28, 32, 33 and 34 must be selected and energized; to print the digit 2 as in Fig. 6 propelling of the wires 2, 3, 4, 6, 10, 14, 18, 22, 26, 31, 32, 33, 34 and 35 is required; and so on, there being different combinations required to form different digits. It can be further seen that where there are several print heads in a line, as in Fig. 2, a separate digit can be printed by each head. And by arranging a number of panels adjacent to one another, each containing several print heads, a long line of characters may be printed.

Here, a separate print head 14 is assigned to each column of a conventional record card for printing whatever digit may be identified with a punching contained in the column. The record card is of the type wherein each column consists of twelve index points adapted to be punched with the two-hole combinational code for alpha characters and the single hole code for numeric characters. It is customary to allot a specific group of card columns for recording a specific kind of information. Here, for the purposes of illustrating this application, we are presently concerned only with numeric characters, the 0–9 index points, and with a card field allotted to the recording of amounts due for billing purposes. The R and X index points are not used here. The perforation, therefore, in each card column of the amount field determines which digit is to be formed in the related print head and which of the associated electromagnets are to be selected and energized to effect printing of the digit. To avoid omission of a significant digit in the amount and for checking purposes, appropriate index points in all columns assigned to the amount field are punched. In those columns not containing a significant digit, punchings are made in the zero index points.

Figure 1:
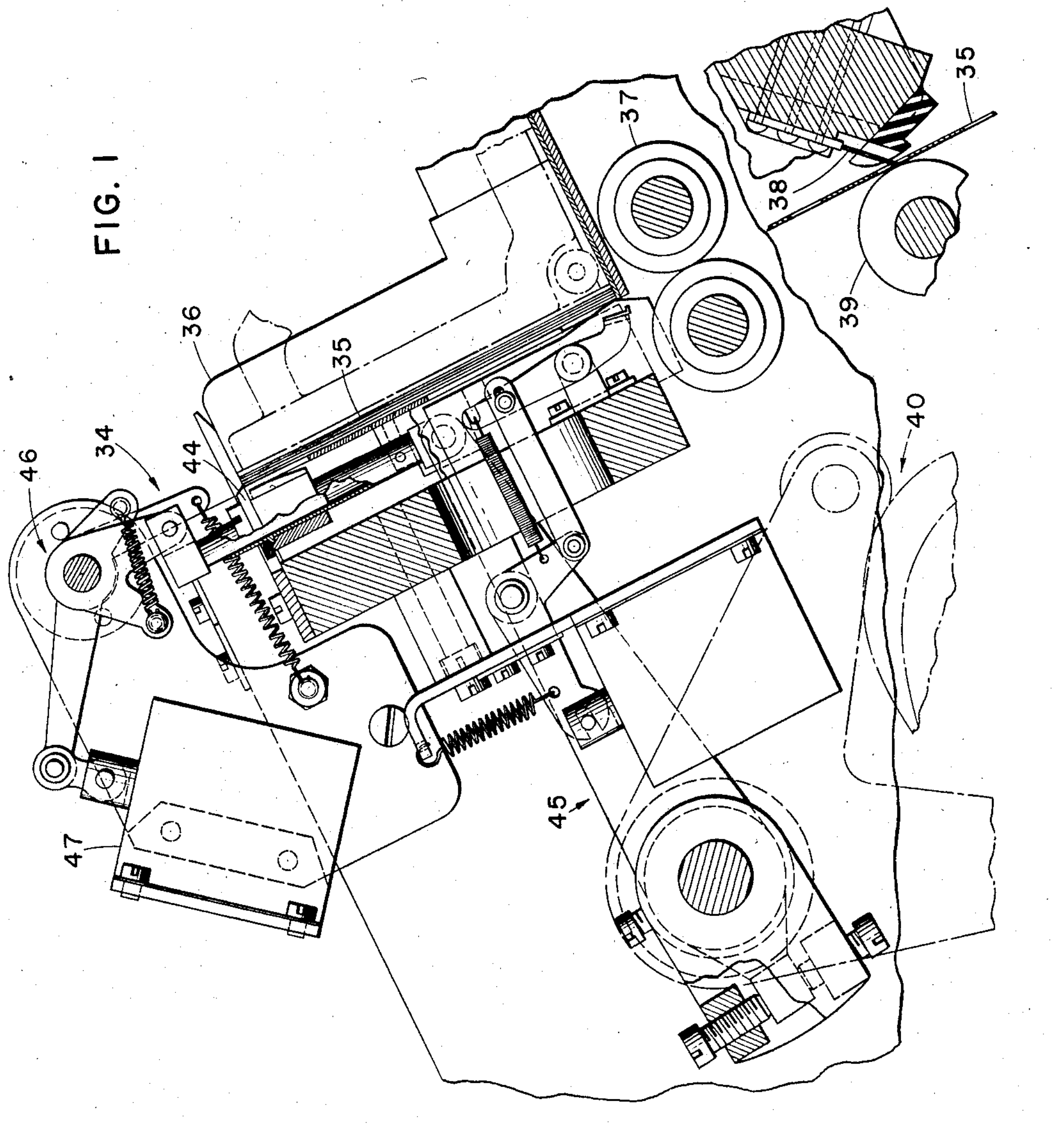
Fig. 1 is a view of the card feed mechanism and part of the sensing arrangement of the machine.

The machine is provided with suitable card feed mechanism, generally indicated at 34 in Fig. 1, by which record cards 35 containing the data to be sensed and subsequently printed, are fed from a magazine 36 to suitable rollers 37 by which they are conveyed to a sensing station, generally indicated by brush element 38 and contact roll 39, it being understood that a separate brush 38 is provided for each card column to be sensed. A billing form 41, fragmentarily shown in Fig. 3, is conveyed in suitable manner and in timed relation to the sensing of the cards to a ribbon 42 of a platen 43 opposite the print head block 12 of a printing station.

The feed mechanism includes a continuously reciprocating picker 44 operated from a drive arm 45 driven by suitable means generally indicated at 40. The picker has a position ineffective for card feeding and a position effective for card feeding. The position of the picker is controlled by associated linkage 46 and solenoid means 47. Upon energization of the solenoid the picker is moved by the linkage 46 to its feeding position and upon deenergization of the solenoid it is drawn back to its non-feeding position. Suitable means is provided for energizing and deenergizing the solenoid.

Figure 8:
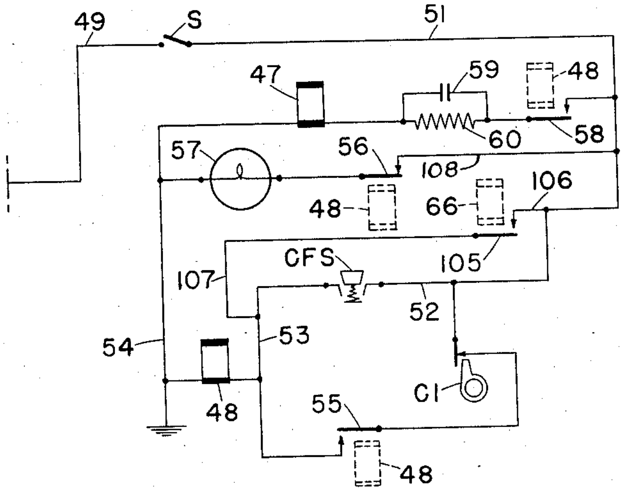
Fig. 8 is a diagram of the card feed starting circuit.
Figure 9:
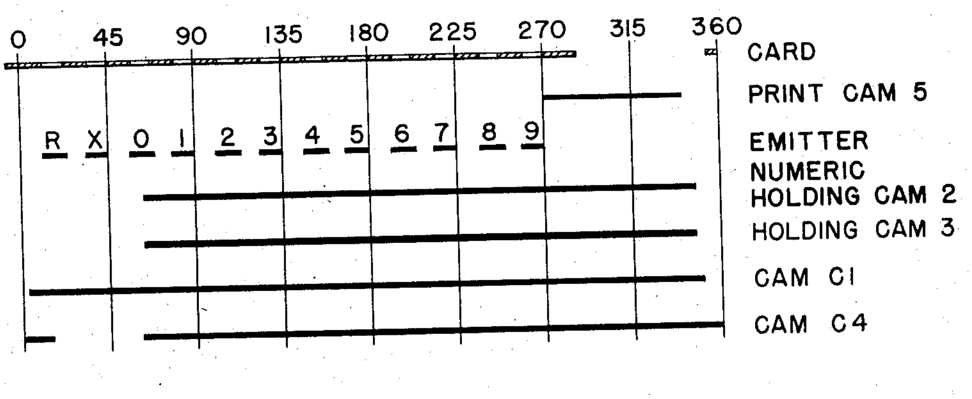
Fig. 9 is a timing diagram.

For the manner of energizing solenoid 47 reference is directed to the starting circuit in Fig. 8. After the line switch S is closed, card feeding is started, by depressing the card feed switch CFS. The latter closes a circuit to energize a start relay 48 from a positive line 49 extended from a suitable D.C. power supply 50, Fig. 7A, now closed switch S, positive conductors 51, 52, manually held closed feed switch CFS, conductor 53, coil of start relay 48 and conductor 54 to ground. Energized relay 48 closes a holding contact 55 under control of breaker cam *c1* to form a holding circuit for relay 48. Normally closed contact 56, now opened by relay 48, breaks its circuit line to extinguish the error signal lamp 57. Lamp 57, which is normally lit with the initial closing of switch S and before starting of feed operations, is extinguished by energization of relay 48 and remains blacked out as long as relay 48 is held energized. Its purpose, if subsequently lit, is to indicate certain operational failures as will be later described. Contact 58 is also closed by energized relay 48 to energize the feed solenoid 47 by a circuit from the positive source over conductor 49, closed switch S, conductor 51, closed contact 58, capacitor and resistor elements 59, 60, coil of feed solenoid 47 and through conductor 54 to ground. With the energization of solenoid 47 card feeding starts as generally described above. After feeding has started, manual pressure is removed from feed switch CFS, which thereupon springs open. Switch CFS is manually held closed until after card feeding starts to avoid denergization of relay 48 by cam *c1* which, for a reason to later appear, momentarily opens its contact in the hold line to relay 48 shortly after the latter is energized. The machine continues to cycle and automatically card feed until the circuit to the feed solenoid 47 is broken by the opening of contact 58 in a manner as will hereinafter be described.

Here it might be noted that the resistor 60, in series with the solenoid 47 and in parallel with the capacitor 59, represents an advantageous and unique arrangement. By means of this circuit arrangement a large current can be sent through the solenoid coil for a brief moment, but sufficiently long enough to energize it, and then withdrawn. By this arrangement it is possible to obtain high speed in starting operations of the feed mechanism associated with the solenoid 47 through a rapid energization of the solenoid. In the high speed process of energizing solenoid 47, the current is promptly carried upon closing of contact 58 through the uncharged capacitor to the solenoid coil and is then promptly reduced as the capacitor is charged. The voltage thereupon drops to a suitable degree and is steadied to the solenoid coil through the combined capacitor and resistor.

As each card is fed from the magazine and is conveyed through the sensing station between a line of brushes 38, each brush successively senses the index points of its related column starting with points Nos. R, X, 0, 1, 2, and so on to the #9 or last index point.

As a brush makes contact through a perforation with the roll 39, circuits are created through an emitter 61 (Figs. 7, 7A) and a wiring arrangement to select and cause to function from a group of electronic control devices T0–T9 one that is identified with the digit sensed. The device selected functions to prepare circuits through a network to effect the energization at the proper time of those electromagnets 30 required to effect the forming and printing of the identified digit. The particular control device selected, should it function properly, will prepare other circuits to an electronically controlled arrangement or checking means which, in the event the control devices selected through the sensings of the other brushes also function properly, enables the machine to automatically continue card feed operations. On the other hand, should any one or more of the selected control devices fail to function properly, or should a control device not be selected for any particular column sensed, such failure will be recognized by the checking arrangement and will be indicated by discontinuance of card feed operations and by other manifestations, such as lighting of the signal lamp 57 and an absence of a printed digit in one or more of the columns of the billing form 41.

As previously stated, each brush is concerned with the sensing of the index points in a specific card column. Assigned to each brush (Figs. 7, 7A) is an individual circuit wiring arrangement including a group of ten electronic control tubes T0–T9. These are gas filled thyratrons of standard structure which have the characteristic of remaining conductive once fired until the plate voltage is removed. The ten tubes control the energization of the thirty-five electromagnets 30 of a particular print head. Each one of the tubes T0–T9 is identified with a particular card index point and controls the energization of those electromagnets required to print the corresponding digit. Each brush circuit also includes a cold cathode gas tube T11, rendered conductive responsive to any one of the ten related thyratrons T0–T9, and a contact control relay 62 responsive to the cold cathode tube. When a tube T11 has been rendered conductive it is a check or indication that one of the ten related tubes T0–T9 has fired or has been rendered operable.

The contact control relay 62 of each brush circuit governs the closing of one of a group of contacts 63–65 plugged in series. When all of the contacts 63–65 are closed by their respective relays a thyratron T12 common to each brush circuit is caused to function and control the energization of a common relay 66. Relay 66 when energized controls the continued energization of solenoid 47 so as to enable the machine to automatically continue card feed operations. In the event one or more of the series contacts 63–65 are not closed, because of a failure in either sensing or the functioning of one of the related thyratrons T0–T9, the common thyratron T12 will not function and the relay 66 will not be energized. In this event the function failure and non-energization of relay 66 will manifest itself in a discontinuance of card feeding, lighting of lamp 57 and further, the circuit causing the failure will be indicated by a failure of print operations in the related print head.

The emitter 61 is made common to the brush circuits of each print head through plug hubs 67. The series contacts are pluggable as indicated at 70, and it is obvious that the action of the common thyratron tube T12 and its associated relay 66 may be limited to any one or more of the brush circuits by plug jumping one or more of the contacts 63–65 of the undesirable circuits.

Figure 7:
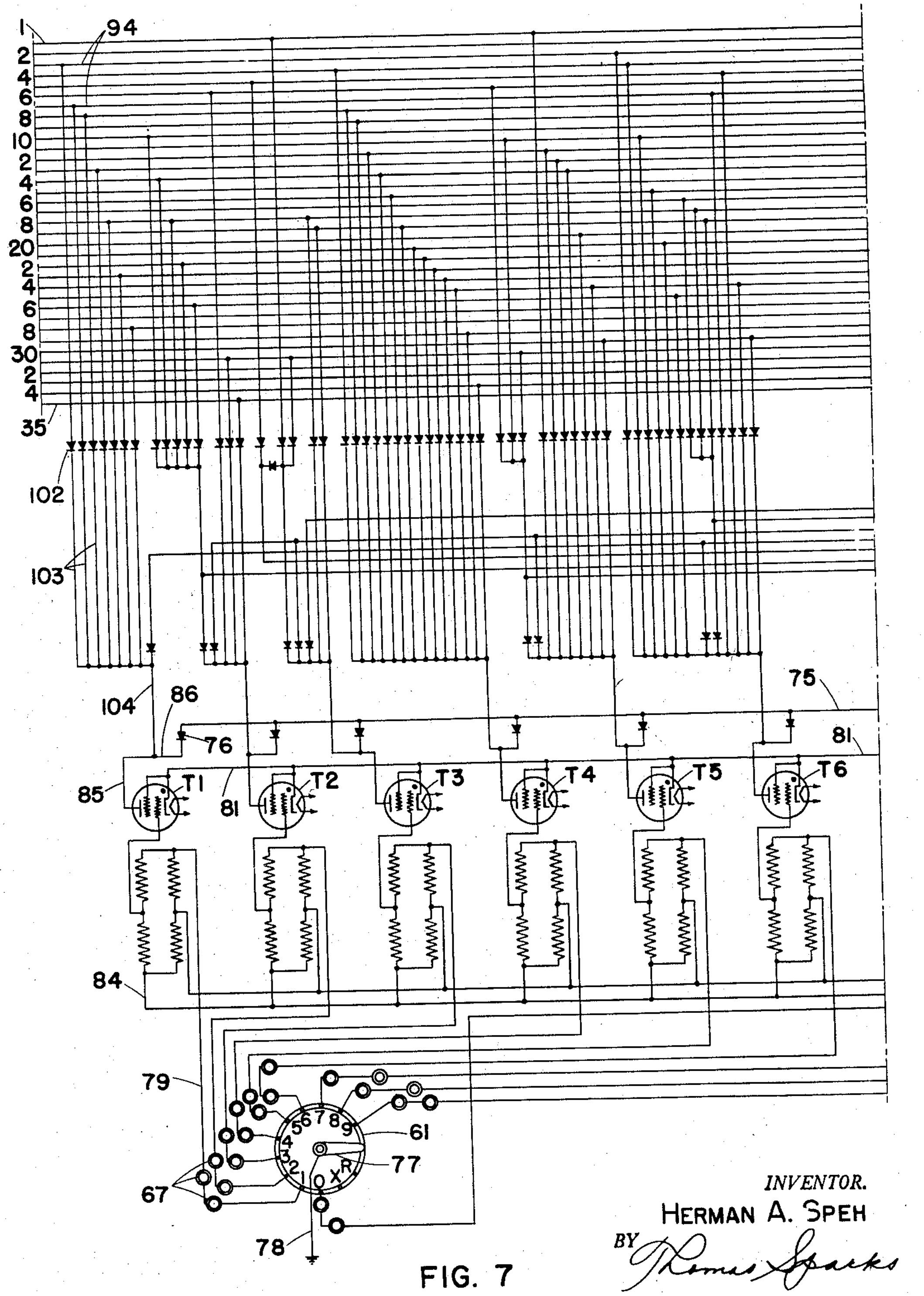
Figs. 7, 7A are diagrams of the decoding and checking circuits.
Figure 7A:
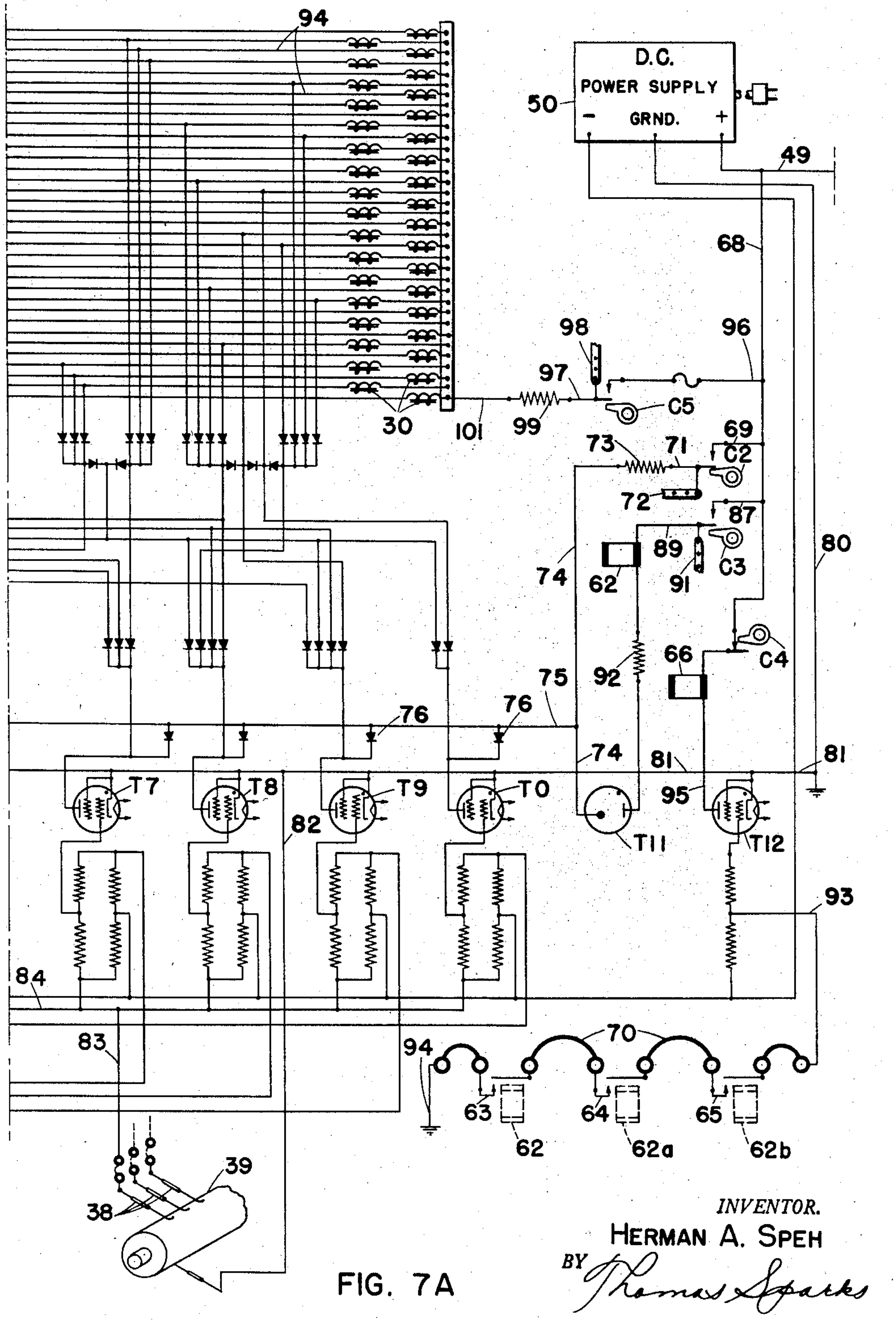

Reference is further directed to Figs. 7, 7A which illustrate the circuits that selectively control the thirty-five magnets associated with the printing elements of one print head, the circuits of the other print heads being similar thereto.

As an example, it will be assumed that in each of three columns assigned as the amount field of a card, there is a perforation in the #1 index point of the first column, #1 in the second column, and #2 in the third. The appropriate electromagnets 30 of the print heads associated with the first and second column brush circuits will be selected for printing on the billing form 41 the digits "1," and the appropriate electromagnets associated with the print head assigned to the third column circuits will be selected to print the "2" digit.

It will suffice to trace one of the brush circuits, it being obvious that the circuits for the first and second column brushes are identical and, that for the third brush differs only with respect to the particular control tube and electromagnets selected.

As a card is conveyed between the control roll 39 and brush 38, the brush starts to successively sense each of the index points R, X, 0, 1, and so on. As the brush begins to sense the 0 index point, a numeric holding cam c2 closes its contact and remains in this condition until after the printing of the digit corresponding to the perforation sensed.

At the beginning of the sensing operation, the selection thyratrons T0–T9 are non-conductive due to the application of a blocking negative bias from the power supply through the bridge network of each tube to the grid thereof. Upon closing of holding cam c2, positive voltage is applied to the plate elements of the tubes T0–T9 from supply, over the positive line 68, conductor 69, closed cam contact c2, conductor 71 connected to the bus 72 that is common to the other print head circuits, voltage dropping resistor 73 the purpose of which will be later explained, conductor 74, common plate supply line 75 and through the rectifiers 76 interjected as intervenors in all plate circuits at points where it is desired to prevent the shunting effect of unrelated circuits connected to the same conductor.

Simultaneously as the brush successively senses the several index points, the emitter wiper 77, rotates therewith, successively engaging contacts corresponding to the index points. Since, in the circuit being traced the #1 index position is punched for the digit "1," contact by brush 38 will be made through the perforation with the roll 39 and, with the emitter wiper 77 simultaneously engaging its #1 contact, a circuit is established from ground, line 78, emitter wiper 77, contact #1, conductor 79 to one midpoint of the grid bridge of tube T1, and at the same time a circuit is established from ground line 80 to the other midpoint of the grid bridge of said tube over the conductors 81, 82, contact roll 39, brush 38, conductor 83 and common line 84. The blocking grid bias is thereby removed, permitting the tube T1 to become conductive. Tube T1 is rendered conductive and maintained conductive by the circuit established from ground, common line 81, elements of tube T1, conductors 85, 86, rectifier 76, common line 75, conductor 74 left, resistor 73, line 71, closed cam contact c2, conductor 69 and positive line 68.

Simultaneously with the closing of cam c2 contact, cam c3 also closed its contact to place a potential on the anode of tube T11 from the positive line 68, conductor 87, closed cam c3 contact, conductor 89 connected to bus 91 common to the other print head circuits, coil of relay 62 and resistor 92. A similar potential was placed on the cathode of tube T11 from the positive line 68, conductor 69, closed cam c2 contact, conductor 71 connected to bus 72, resistor 73 and through conductor 74. There being a lack of difference in the applied potential, tube T11 is unable to fire. However, when tube T1 is rendered conductive there is a voltage drop over the resistor 73 which creates a sufficient difference in potential to cause tube T11 to ionize and fire. This circuit is extended from ground line 81 through the elements of tube T1, conductors 85, 86, rectifier 76, common line 75, path of conductor 74 away from resistor 73, through the elements of tube T11, resistor 92, winding of relay 62, conductor 89, closed cam c3 contact, conductor 87 and over the positive line 68. Thereupon, relay 62 wired in series in the plate line of tube T11, is energized, and causes its particular contact 63 in the series 63–65 to close. Thyratron tube T12 controlling the energization of relay 66 in its plate line is not rendered conductive until after removal of a blocking negative bias originally on its grid from the power supply. The blocking bias is removed when all of the contacts 63–65 are closed to ground. When contact 63 closed, contact 64 also closed upon the energization of its associated relay indicated in dotted lines at 62a, since the brush of the second column print head circuits also sensed a #1 index point punch in its assigned card column. The third contact 65 later closed upon energization of its associated relay indicated in dotted line at 62b through the sensing of the #2 index point by the third column brush. With the closing of the several contacts 63–65 a ground circuit from the midpoint of the grid legs of tube T12 is closed extending over conductor 93, contacts 63–65 plugged in series and now closed, and conductor 94 to ground, thereby removing the blocking bias from the grid of the tube T12 and causing it to fire. Like the other thyratrons, tube T12 is held conductive once fired until its plate voltage is removed. Tube T12 is held conductive by the circuit established from ground, common line 81, elements of tube T12, plate line 95, coil of relay 66, normally closed cam c4 contact, and positive line 68. Relay 66 wired in series in the plate line of tube T12 is energized when tube T12 is rendered conductive, and it remains energized for a portion of the next operating cycle. It is deenergized at the proper time by the momentary opening of the cam c4 contact which breaks the positive line. The purpose of relay 66, as stated earlier, is to enable continued card feed operations if energized by tube T12, or to allow the feed mechanism 34 to become disabled if not energized.

Brush 38 continues to sense the remaining numerical index points of the card, and upon sensing the #9 or last index point the print cam c5 closes its contact to complete circuits prepared by the firing of tube T1 for the energization of the ten electromagnets 30, whose associated printing elements 15, (Fig. 2) are required to form and print the digit "1." These circuits extend over the positive line 68, conductor 96, now closed cam contact c5, line 97 connected to bus 98 for the other print head circuits, resistor 99, bus line 101 connected to the coils of the thirty-five electromagnets 30, windings of ten of these electromagnets controlled by tube T1, the ten conductors 94 connected to the windings, unidirectional rectifiers 102, the ten related conductors 103, line 104 and through the elements of tube T1 to ground.

The several magnets associated with the digit "1," upon being energized effect in a manner and by suitable mechanism, as earlier described, propulsion of their respective print elements 15 to effect printing on the billing form 41 (Figs. 2, 3). Similar action takes place through the circuits of the other print heads assigned to the other card columns of the amount field to respectively effect printing of the "1" and "2" digits.

After printing is effected cam c2 opens the plate line to restore tubes T0–T9 and T11 to their non-conductive condition. The plate line to tube T12 is not broken at this time, and this tube remains conductive until the plate circuit is broken by momentary opening, before the next sensing operation, of cam contact c4.

The card feed mechanism automatically continues operating after sensing and printing have been effected with respect to a card. This is enabled (Fig. 8) by the closing of contact 105 controlled by relay 66 to maintain a circuit from the positive line 49, closed switch S, conductors 51, 106, now closed contact 105, conductors 107, 53, coil of relay 48, and over conductor 54 to ground. Contact 58, held closed by relay 48, maintains the circuit to keep the feed solenoid 47 energized. Shortly after contact 105 is closed, cam contact c1 opens, but too late to have any effect on the circuit to relay 48 as contact 105 is still closed. Cam contact c4 momentarily opens, after the continued energization of relay 48 is assured and breaks the circuits to the plate of tube T12 and relay 66 in preparation for the next sensing operation.

The continued operation of the card feed mechanism is a signal or an indication that proper sensing and functioning of the electronic control tubes T0–T9 had taken place in the several brush circuits.

In the event that one of the series contacts 63–65 had not closed, circuits would not, as previously described, have been completed to energize control relay 66. In this event contact 105 would not have closed and with the subsequent opening of the cam c1 contact the hold circuit through contact 55 to start relay 48 would have been broken, whereby relay 48 would become deenergized causing its contact 58 to open. Opening of contact 58 breaks the circuit in the positive line to the coil of solenoid 47 causing it to be deenergized and, in a manner as related above, disables the card feed mechanism.

Further, a failure of relay 66 to energize causes, with deenergization of relay 48, lamp contact 56 to close and light up the error signal lamp 57 by a circuit extended from the ground line 54, elements of lamp 53, normally closed contact 56, and positive conductor 108, and line 51.

Further, it is now quite apparent, a failure of relay 66 to energize will be indicated in the billing form 41 by an absence of one or more printed digits due to either a sensing or an electronic control tube failure.

While I have described what I consider to be a desirable embodiment of my invention, some changes in form might be made without departing from the spirit of the invention, and I therefore do not limit myself to the exact form herein shown and described, nor to anything less than the whole of my invention as herein set forth and as hereinafter claimed, and it is my intent to claim all that may be reasonably construed to be within the spirit of the invention and within the scope of the appended claims.

I claim:

1. In a device for checking whether, in several groups of electronic control devices employed in a machine for control purposes, any one electronic control device of one or more of the groups has failed to become conductive, a cold cathode gas tube normally in a non-conductive state in the circuit of each group of electronic control devices and ionizable by any one of the electronic control devices of the group related thereto becoming conductive, a relay individual to each cold cathode tube and energizable by and upon the related cold cathode tube becoming ionized, a single electronic control device common to the several cold cathode tubes, an open circuit from ground to the grid network of the single electronic control device, the open ground circuit comprising a group of open contacts wired in series, one for each relay, each of the contacts adapted to be closed upon its respective relay becoming energized, said common electronic device adapted to be ionized upon all of said contacts closing to ground and non-ionizable upon one or more not closing, said common electronic device upon failure to become ionized serving to indicate a failure of conduction to have taken place with respect to electronic control devices in one or more of the groups, and upon being ionized being adapted to control objective means indicating conduction to have taken place in all groups of the electronic control devices.

2. In a record card controlled machine including electronic print control devices selectively rendered conductive responsive to data elicited from a record card by sensing and decoding means, solenoid controlled card feed means for feeding cards to the sensing and decoding means, relay means operable at the end of an operating cycle to render the solenoid effective for continued card feeding, and other electronic means rendered conductive responsive to and upon a selected electronic print control device being rendered conductive enabling effective operation of the relay means.

3. In a record card controlled machine including electronic print control devices selectively rendered conductive responsive to data elicited from a record card by sensing and decoding means, solenoid controlled card feed means for feeding cards to the sensing and decoding means, relay means for effecting continuous energization of the solenoid controlling the feed means, other electronic means rendered conductive responsive to and upon a selected electronic print control device being rendered conductive enabling energization of the relay means, and cam means for disabling said solenoid automatically operable upon failure of said other electronic means to become conductive.

4. In a record card controlled machine, means for sensing and decoding a data representation in each of certain card columns, electronic means individual to each card column and rendered conductive responsive to the data sensed in each column, solenoid controlled feed means for feeding cards to the sensing and decoding means, an electronic control device rendered conductive upon each of said electronic means becoming conductive, cam means for cyclically disabling the circuit to the solenoid controlled feed means, means controlled by the electronic control device only when the latter is rendered conductive and for rendering said cam means ineffective to disable the circuit to the solenoid controlled feed means.

5. In a record card controlled machine including for each card column electronic print control devices selectively rendered conductive responsive to circuits created by sensed data, a checking device for determining whether a selected electronic print control device for any of the card columns has failed to function, including a cold cathode electronic element associated with the electronic print control devices for each card column and rendered conductive responsive to conduction in any of the related electronic print control devices, relay means individual to and energizable by each cold cathode element, a set of open ground contacts in series, one contact for each relay, a common electronic element rendered conductive responsive to all of the series contacts closing indicating all selected electronic print control devices to have functioned.

6. In a business machine adapted for sensing record card perforations employing for each of a specific number of columns to be sensed a separate decoding means and a plurality of electronic control devices selectively rendered conductive responsive to the sensing circuits decoded, an electronic checking device comprising for each plurality of electronic control devices and in parallel with the plate circuits thereof, a cold cathode electronic member in series with a current limiting resistor, each cold cathode member rendered separately ionizable responsive to any selected one of the related electronic control devices becoming conductive, and non-ionizable upon none of said related control devices becoming conductive, a relay individual to each cold cathode member and energizable thereby upon the related cold cathode member becoming ionized, a function control circuit including a group of open contacts wired in series one closable by each relay element when energized, whereby the function control circuit is established upon the closing of all contacts by the several relays when energized and not established upon any one of said contacts not being closed by its respective relay.

7. In a business machine adapted for sensing record card perforations employing for each of a specific number of columns to be sensed a separate decoding means and a plurality of electronic control devices selectively rendered conductive responsive to the sensing circuits decoded, an electronic checking device comprising for each plurality of electronic control devices and in parallel with the plate circuits thereof, a cold cathode electronic member in series with a current limiting resistor, each cold cathode member rendered separately ionizable responsive to any selected one of the related electronic control devices becoming conductive, an non-ionizable upon none of said related control devices becoming conductive a relay individual to each cold cathode member and energizable thereby upon the related cold cathode member becoming ionized a common function control electronic element normally non-conductive because of a blocking grid arrangement, a ground circuit connected to the said grid arrangement including a group of normally open contacts wired in series, one closable by each relay element when energized, whereby the function control electronic element is rendered conductive for function control purposes upon the closing of all the contacts to ground by the several relays when energized and maintained non-conductive upon any one of said contacts not being closed by its respective relay.

8. In a printing machine adapted for sensing record card perforations employing for each of a specific number of columns to be sensed a separate decoding means and a plurality of electronic control devices selectively rendered conductive responsive to the sensing circuits decoded, the electronic control devices serving to control the printing of characters corresponding to the perforations sensed, an electronic checking device comprising for each plurality of electronic control devices and in parallel with the plate circuits thereof a cold cathode electronic member in series with a current limiting resistor, each cold cathode member rendered separately ionizable responsive to any selected one of the related electronic control devices becoming conductive, and non-ionizable upon none of said related control devices becoming conductive, a relay individual to each cold cathode member and energizable thereby upon the related cold cathode member becoming ionized, a common function control electronic element normally non-conductive because of a blocking grid arrangement, a ground circuit connected to the said grid arrangement including a group of normally open contacts wired in series, one closable by each relay element when energized, whereby the function control electronic element is rendered conductive for function control purposes upon the closing of all the contacts to ground by the several relays when energized and is maintained non-conductive upon any one of said contacts not being closed by its respective relay, a failure of the function control electronic element to be rendered conductive indicating a failure in one or more of the circuits to the electronic control devices.

9. In a printing machine adapted for sensing record card perforations employing for each of a specific number of columns to be sensed a separae decoding means and a plurality of electronic control devices selectively rendered conductive responsive to the sensing circuits decoded, the electronic control devices serving to control the printing of characters corresponding to the perforations sensed, an electronic checking device comprising for each plurality of electronic control devices and in parallel with the plate circuits thereof, a cold cathode electronic member in series with a voltage dropping resistor, each cold cathode member rendered separately ionizable responsive to any selected one of the related electronic control devices becoming conductive, and non-ionizable upon none of said related control devices becoming conductive, a relay individual to each cold cathode and energizable thereby upon the related cold cathode member becoming ionized, a common function control electronic element normally non-conductive because of a blocking grid arrangement, a ground circuit connected to the said grid arrangement including a group of normally open contacts wired in series, one closable by each relay element when energized, whereby the function control electronic element is rendered conductive for function control purposes upon the closing of all the contacts to ground by the several relays when energized and is maintained non-conductive upon any one of said contacts not being closed by its respective relay, conduction in the function control element reflecting proper functioning of all of the electronic control devices.

10. In a cyclically operable business machine adapted for sensing record card perforations and employing for each of a specific number of columns to be sensed a separate decoding means and a plurality of electronic control devices selectively rendered conductive responsive to the sensing circuits decoded, solenoid means adapted to control cyclic feeding of cards for sensing, an electronic checking device comprising for each plurality of electronic control devices and in parallel with the plate circuits thereof a cold cathode electronic member, each cold cathode member rendered separately ionizable responsive to any selected one of the related electronic control devices becoming conductive and non-ionizable upon none of said related control devices becoming conductive, a relay individual to each cold cathode member and energizable thereby upon the related cathode member becoming ionized, a common function control electronic element normally non-conductive as having a blocking grid arrangement, a ground circuit connected to the said grid arrangement including a group of normally open contacts wired in series, one closeable by each relay element when energized, whereby the function control element is rendered conductive for function control upon the closing of all the contacts to ground by the several relays when energized, and maintained non-conductive upon any one of said contacts not being closed by its respective relay, and means controlled by the function control element when conductive for maintaining the solenoid means controlling card feeding cyclically effective.

11. In a cyclically operable business machine adapted for sensing record card perforations and employing for each of a specific number of columns to be sensed a separate decoding means and a plurality of electronic control devices selectively rendered conductive responsive to the sensing circuits decoded, solenoid means adapted to control cyclic feeding of cards for sensing, and an electronic checking device comprising for each plurality of electronic control devices and in parallel with the plate circuits thereof a cold cathode electronic member each cold cathode member rendered separately ionizable responsive to any selected one of the related electronic control devices becoming conductive and non-ionizable upon none of said related control devices becoming conductive, a relay individual to each cold cathode member and energizable thereby upon the related cathode member becoming ionized, a common function control electronic element normally non-conductive as having a blocking grid arrangement, a ground circuit connected to the said grid arrangement including a group of normally open contacts wired in series, one closeable by each relay element when energized, whereby the function control element is rendered conductive for function control upon the closing of all the contacts to ground by the several relays when energized, and maintained non-conductive upon any one of said contacts not being closed by its respective relay, means controlled by the function control element when conductive for maintaining the solenoid means controlling card feeding cyclically effective and other means cyclically automatically operable upon a failure of said function control element to be rendered conductive to disable the solenoid means controlling card feeding.

12. A business machine as in claim 10 wherein the solenoid means is adapted for high speed operation and includes for this purpose a D.C. voltage line to the winding of the solenoid, a capacitor and resistor connected in parallel to one another and in series with the solenoid, and a switch in the voltage line, whereby upon closing of the switch the full line voltage is promptly carried to the solenoid from the uncharged capacitor sufficiently long enough to energize the solenoid and then dropped suddenly to a lower voltage by the combined action of the capacitor and resistor.

13. In a machine, a plurality of groups of electronic control devices normally in a non-conductive condition; circuit creating means for selectively rendering one of the said control devices in each group in a conductive condition; other electronic control means individual to each group and common to all of the electronic control devices in the related group individually rendered operable responsive to any one of the control devices in the related group becoming conductive; a single bistable control means, normally in a first stable condition, but upon being operated to a second stable condition, adapted to control at least one function, said bistable means being operable to said second stable condition responsive to all of said other electronic control means becoming operable but remaining in said first stable condition while any of said other electronic control means remains unoperated, and means to reset said bistable means to said first stable condition.

14. In a recording machine including, for each of a plurality of recording columns, a group of electronic recording control devices, a checking means for determining whether an electronic recording control device in each of said groups has functioned, said checking means comprising, for each of said groups of electronic recording control devices, an individual cold cathode electronic element in circuit with all of the electronic recording control devices of said group and operated from one to the other of its non-conducting and conducting states responsive to functioning of any electronic recording control device of its group, an individual relay having an energizing winding in circuit with each cold cathode electronic element and having a contact pair operable responsive to operation of said cold cathode element, an indicating means, and a control circuit including the contact pairs of all of said relays and operable to control said indicating means responsive to non-operation of any of said contact pairs to indicate failure of an electronic recording control device in any of said groups to function.

15. In a record controlled machine including record feed means and, for each of a plurality of control record columns, a group of electronic control devices, a checking means for determining whether an electronic control device in each of said groups has functioned, said checking means comprising, for each of said groups of electronic control devices, an individual cold cathode electronic element in circuit with all of the electronic control devices of said group and operated from one to the other of its non-conducting and conducting states responsive to functioning of any electronic control device of its group, an individual relay having an energizing winding in circuit with each cold cathode electronic element and having a contact pair operable responsive to operation of said cold cathode element, a control circuit including the contact pairs of all of said relays and means controlled by said control circuit responsive to non-operation of any of said contact pairs to discontinue operation of said record feed means upon failure of an electronic recording control device in each of said groups to function.

16. In a machine for sensing records and having for each of a plurality of record columns to be sensed, a sensing device, decoding means and a group of electronic devices each having an anode and a cathode, one of which electrodes of each electronic device is connected with a common circuit portion, said electronic devices also having control electrodes connectible through said decoding means individually in predetermined order with said sensing device for selective operation of said electronic devices under control thereof, a checking means comprising for each such group of electronic devices a further electronic device associated with said common circuit portion of the respective group to be operated from one to the other of its conducting and non-conducting states directly upon operation of any electronic device of said group but maintained in said one state while none of the electronic devices of said group has been operated, and a machine control means controlled jointly by all of said further electronic devices for all of said groups.

17. In a machine for sensing records and having for each of a plurality of record columns to be sensed, a sensing device, decoding means and a group of electronic control devices each having an anode and a cathode, one of which electrodes of each electronic control device is connected with a common circuit portion, said electronic control devices also having control electrodes connectible through said decoding means individually in predetermined order with said sensing device for selective operation of said electronic control devices under control thereof, a checking means comprising for each such group of electronic devices and, in parallel with said common circuit portion of the respective group, a cold cathode electronic device in series with a current-limiting resistor and operable from one to the other of its conducting and non-conducting states directly upon operation of any electronic control device of said group but maintained in said one state while none of the electronic control devices of said group has been operated, and a machine control means controlled jointly by the cold cathode devices of all of said groups.

18. In a machine for sensing records and having for each of a plurality of record columns to be sensed, a sensing device, decoding means and a group of electronic devices each having an anode and a cathode, one of which electrodes of each electronic device is connected with a common circuit portion, said electronic devices also having control electrodes connectible through said decoding means individually in predetermined order with said sensing device for selective operation of said electronic devices under control thereof, a checking means comprising, for each of said groups of electronic devices and in parallel with said common circuit portion, a cold cathode electronic device to be operated from non-conducting state to its conducting state directly upon operation of any electronic device of said group but maintained in said non-conducting state while none of the electronic devices of said group has been operated, an individual electro-magnetic control device connected in series with each of said cold cathode devices, and a machine control means controlled jointly by all of said electro-magnetic control devices.

19. In a record-card-controlled apparatus including a record card feeding means; a plurality of groups of electronic control devices normally in a non-conductive condition and each representative of data coded into a record card, a record-card-controlled selective means for each of said groups for creating circuits to one of said devices of its group corresponding to the data coded into the record card, whereby said selected device is rendered conductive responsive thereto, other control means for each of said groups having circuit connections common to all of said devices of its group and operable upon any one of said devices of said group becoming conductive, and a circuit including means to control said card feeding means and controlled jointly by all of said other control means for all of said groups to disable said card feeding means when, in any of said groups of electronic control devices, no device in the group is rendered conductive.

20. In a data-processing machine, data input means, a plurality of data-sensing means, a plurality of groups of electronic control devices, one group for each of said sensing means, each said device being normally in a non-conductive condition, circuit creating means for each of said groups controlled by a respective one of said sensing means for selectively rendering any one of the electronic control devices of its group in a conductive condition, other electronic control means for each of said groups rendered operable responsive to any one of said electronic control devices of its group becoming conductive, a control circuit including elements controlled by each of said other electronic control means and control means controlled by said control circuit to control at least said data input means.

21. In a cyclically operable data-processing apparatus having means for cyclically operating said apparatus, control means to control operation of at least a portion of said apparatus by said operating means, a plurality of parallel data bit processing circuits, each said circuit comprising a group of electronic devices normally in a non-operated condition and means to operate at least one device of the group to an operated condition in processing a data bit in a predetermined period of time in a cycle of operation, the provision of checking means comprising, for each of said groups of electronic devices, circuit means associated with all of said devices of said group and including a normally non-operated means operable in response to any electronic device of the associated group being operated, a plurality of circuit control devices each controlled by a respective one of said last-named means, a control circuit including all of said circuit control devices, a bistable device controlled by said control circuit and operable in response to operation of all said last-named means from a first stable state to a second stable state, means controlled by said bistable device to operate said control means when said bistable device is in its second state at a time subsequent to said predetermined period in a cycle of operation and prior to said period in a subsequent cycle of operation, and means operated by said operating means subsequent to said time of operation of said control means and prior to said predetermined period in said subsequent cycle of operation to restore said bistable device to its first state.

References Cited in the file of this patent

UNITED STATES PATENTS

| | | |
|---|---|---|
| 2,475,340 | Shafer | July 5, 1949 |
| 2,602,545 | Luhn et al. | July 8, 1952 |
| 2,620,977 | Stewart et al. | Dec. 9, 1952 |
| 2,693,907 | Tootill | Nov. 9, 1954 |
| 2,712,065 | Elbourn et al. | June 25, 1955 |

OTHER REFERENCES

"Digital Computer Switching Circuits," by C. H. Page, Electronics, September 1948, pp. 110–116. Page 112 only is relied upon.